Dec. 2, 1958  J. D'ANGELO  2,862,400

GEAR

Filed March 19, 1957

INVENTOR.
JOSEPH D'ANGELO
BY
David Rabin
ATTORNEY

United States Patent Office 2,862,400
Patented Dec. 2, 1958

2,862,400

GEAR

Joseph D'Angelo, Greensboro, N. C.

Application March 19, 1957, Serial No. 647,051

6 Claims. (Cl. 74—460)

The present invention relates to gears and relates more particularly to a gear having integrally formed therewith a continuous reinforcing webbing for each of the teeth constituting the gear blank.

It is well known in the design of gear teeth that a short tooth with a wide root such as a 20 degree stub tooth yields a higher beam strength over a 14½ degree full depth tooth of the same pitch for gears of equal size. Where heavy shock loads or vibration is encountered the wide root is desirable for increased strength properties. To transmit load more uniformly a full depth tooth which is longer than a stub tooth is provided so that a longer arc of contact and more teeth are in contact to carry a prescribed load is utilized. Many attempts have been made to reduce the size of gears, however, due to the load requirements made on each individual tooth on the gear and the possibility of interference with involute teeth, which normally necessitates some undercutting thus reducing still further the load bearing strength capacity of each tooth, have prevented the reduction in gear size. It will be apparent that by providing a larger size gear the angle of approach and the angle of recess, both angles constituting the angle of action for the gear, with a greater number of teeth being in contact, the load distribution for the individual teeth remaining in contact during the angle of action will be more uniformly distributed.

It is contemplated by the present inventive concept to provide an integral gear blank in which each tooth is reinforced by a solid web that is integral with the gear tooth but which web will not interfere with gear action as the teeth, regardless of the conjugate tooth profiles, will be so formed as to produce pure rolling contact of the pitch surfaces and the normal sliding action with the mating teeth may occur without interference.

Therefore, one of the objectives of this invention is the provision of a reinforced gear in which the individual teeth are reinforced by the integral formation of a continuous web formed with the teeth.

Another object of this invention is to provide a cast or molded gear blank in which the gear teeth have integrally formed therewith a continuous web on at least one side of the gear blank.

A further object of this invention is to provide a stepped or staggered tooth gear integrally cast with a continuous web formed between adjacent gear portions to permit smoother gear action, improved distribution of load forces over the gear steps, with tooth load being transmitted to the web between teeth.

Yet another objective of this invention is the provision of a stepped spur gear in which the steps are separated by an intermediate integral webbing to absorb load transmitted to the gear teeth below the pitch circle permitting gears of smaller size to be utilized to absorb and transmit equal loads.

Still another object of this invention is to provide a cast gear of increased strength wherein the individual gear teeth have a reinforced web integrally formed with the gear teeth but which web will not interfere with rolling contact of intermeshing gears.

A further objective of this invention is the provision of a solid cast or molded gear of staggered or stepped tooth construction wherein the individual teeth are integrally reinforced by means of a continuous webbing between adjacent steps or at the side faces thereof.

It is further contemplated to provide a pinion and rack in which the individual teeth are of staggered arrangement with each tooth integrally reinforced by means of a continuous webbing that is undercut to preclude interference with rolling contact of the mating gears.

Other and further objects and many of the attendant advantages of this novel gear construction will become more readily apparent as the invention becomes better understood from the following detailed description taken in conjunction with the accompanying drawing in which like characters of reference designate corresponding parts throughout the several views, and wherein.

Figure 2:
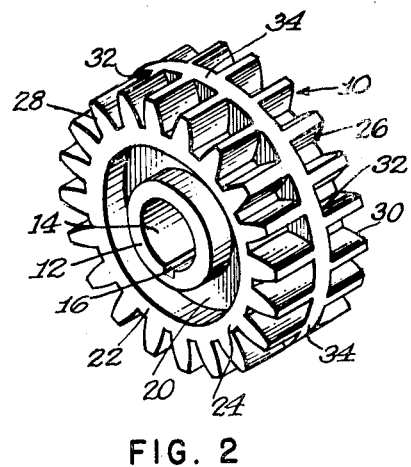
Fig. 2 is a perspective view of an integral gear blank having opposed staggered teeth with an intermediate continuous webbing prior to machining the webbing.

Referring to the drawing and more particularly to Fig. 2, there is illustrated therein a gear blank 10 which is a preliminary form of the inventive concept that is produced in one of the conventional casting processes such as by die casting, sand casting, investment casting, shell molding or by the sintering of powdered metals. It will be readily apparent that the gear produced by any of the above enumerated processes as well as others may employ various materials and it is contemplated that the materials from which the gear blank may be constructed will range from nylon, the common thermosetting plastics and other non-ferrous metals to the ferrous metals and alloys thereof. Gear blank 10 which is shown for illustrative purposes only is constituted by an integrally formed gear in which the central portion of the blank 10 has a boss 12 through which there is bored a center shaft-receiving opening 14 and a keyway 16 that is machined therein. Each of the side faces of the gear blank has an annular recess 20 that extends from the boss 12 to a projecting rib or rim 22.

In the embodiment shown in Fig. 2, which is illustrative of a gear blank that may be formed by a die casting process, there are two spur gear portions 24 and 26 that are integrally formed with the rim supporting defined involute teeth 28 and 30 on the gear portions 24 and 26 respectively which gear portions are in spaced axial relation to each other with the inside side faces 32 of the gear teeth being integrally formed with a continuous spacer web 34 between the gear portions. Web 34, in Fig. 2, extends from the solid center portion of the gear blank to the addendum circle of the gear teeth.

The beam strength or load bearing limits of individual teeth in a spur gear of the conventional cast gear construction is relatively weak and shearing failure is common. This characteristic of gear teeth necessitates an increase number of teeth to be constantly in contact during the angle of action of the gear teeth so that a transmitted load may be distributed over a large number of gear teeth that are in contact at various points on each of the teeth. By having the gear blank cast with a continuous web that is integral to the side faces of the gear teeth on at least one side thereof, the individual gear teeth constituting the gear may be greatly reinforced thereby increasing the load bearing capacity of the individual teeth.

Fig. 2 illustrates a gear blank of one preferred construction in which the continuous web 34 reaches to the addendum circle between the two gear portions and the teeth in each of the gear portions are in stepped or staggered relation to each other. This arrangement will yield smoother and quieter tooth action simulating the final action of helically formed tooth gear construction.

Obviously for mating gears it will not be possible to employ similarly constructed gears for mounting on parallel shafts due to the heighth of the web 34 depicted in Fig. 2. However, either axially spaced individual gears may be employed to engage with each individual gear section of the gear blank 10 or a corresponding integral gear construction may be used that is similar to the gear blank of Fig. 2 and having the same diametral pitch but the continuous web of the mating gear will have to be undercut to provide adequate clearance between the addendum or other diameter of the one gear blank and the dedendum circle of the intermeshing gear.

In Figs. 1, 3, 4 and 5 there is shown a cast gear blank that has been machined to provide the desired completed gear in which the individual spur gear sections may have involute teeth or some other conjugate tooth configuration whether of the 14½ degree full-depth, 20 degree full-depth, 20 degree stub tooth or any other tooth system. The continuous web 34 shown in Fig. 2 that extends to the addendum circle of the gear teeth has been undercut to formulate a continuous web 38 that has a diameter that is less than the diameter of the pitch circle of the gear. In this construction no interference with the desired rolling action of the gear teeth may occur.

The load to which the gear is subjected will be transmitted to the individual teeth during intermeshing action between similar gears. However, the strength of each tooth is greatly increased by the integral reinforcement provided at the flank of the teeth, the position where failure most frequently takes place.

Figure 1:
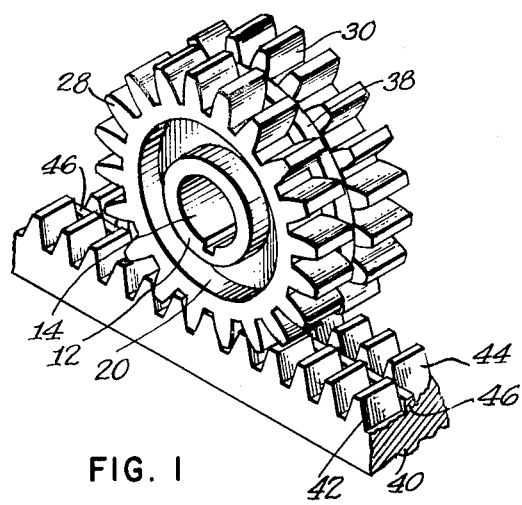
Fig. 1 is a perspective view of a gear and intermeshing rack illustrating one embodiment of the present inventive concept.
Figures 3, 4, 5:
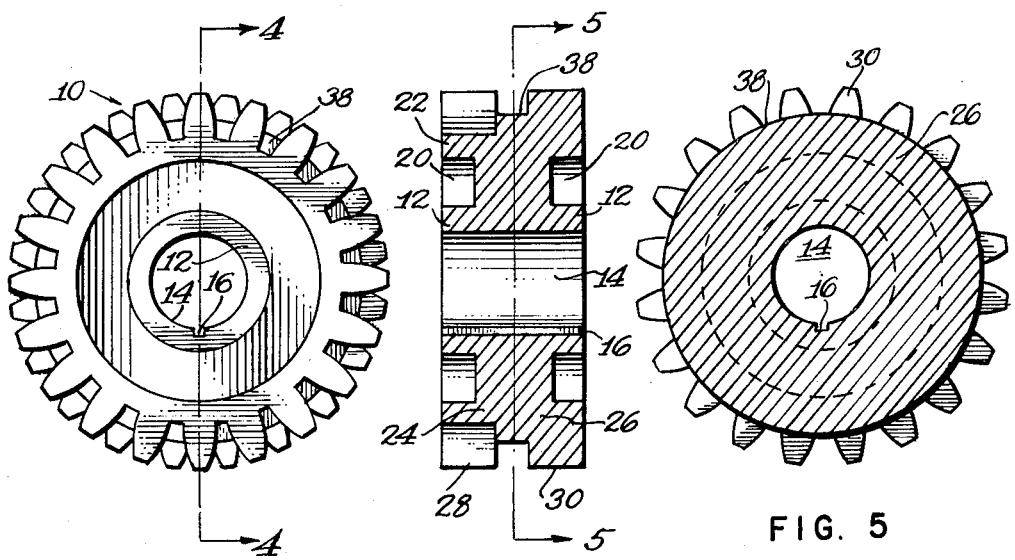
Fig. 3 is a side view of a gear similar to the gear illustrated in Fig. 1.
Fig. 4 is a transverse sectional view taken substantially along the plane of section line 4—4 of Fig. 3.
Fig. 5 is a transverse sectional view taken substantially along the plane of section line 5—5 of Fig. 4.

Fig. 1 depicts a completed pinion gear of the type shown in Figs. 3 to 5 in meshing engagement with the integrally formed rack 40 which rack also is provided with gear portions 42 and 44 with a staggered tooth arrangement corresponding to the pinion. Rack 40 is cast with a continuous web 46 between gear portions 42 and 44 with the web 46 being undercut below the pitch line to preclude interference with the undercut web 46 on the pinion gear.

Although a single integral gear and a pair of gear sections having staggered teeth of the spur gear type having been described in detail, it is contemplated that additional sections may be employed with each section or alternate sections being separated by a continuous cast web. Similar results from cast gear sections provided with an intermediate integrally cast web between sections may be utilized achieving increased tooth strength and appreciable reduction in the cost of machining. The integral or solid construction makes possible the use of smaller size gears for load transmisison with equivalent load bearing capacities.

Obviously, many modifications and variations may be made in the construction and arrangement of the integral web and the heighth and width of the web and the number of gear tooth portions in the light of the above teachings without departing from the real purpose and spirit of this invention. It is, therefore, to be understood that within the scope of the appended claims many modified forms of the present inventive concept as well as the use of alternative constructions may be reasonably made and modifications are contemplated.

What is claimed is:

1. A gear of integral construction of the character described having a first gear portion with solid gear teeth thereon and a second gear portion with solid gear teeth thereon, said second gear portion being in spaced axial relation to said first gear portion, the teeth of said gear portions being in staggered relation to each other, and a web between said gear portions communicating with the teeth of each portion and integral therewith, said web terminating below the pitch circle of the gear teeth.

2. A machined gear of integral cast construction having a first gear portion with solid gear teeth thereon, and a second gear portion with solid gear teeth thereon, said gear portions being in spaced axial relation to each other, the gear teeth of the second gear portion being in staggered relation to the gear teeth of said first gear portion, and a web integral with the gear portions, said web extending with and between said teeth and terminating at a position approaching the pitch circle of the gear.

3. A gear of integral solid cast construction of the character described having a first gear portion with gear teeth thereon and a second gear portion with gear teeth thereon, said second gear portion being in spaced axial relation to said first gear portion, the teeth of said gear portions being in staggered relation to each other, and a continuous web between said gear portions communicating with all of said teeth and integral therewith, said web extending from below the pitch circle of the gear blank to at least the root circle.

4. A gear of integral cast construction having a first gear portion with solid gear teeth thereon and a second gear portion with solid gear teeth thereon, said gear portions being in spaced axial relation to each other, and a continuous web between said gear portions communicating with all of said teeth and being integral therewith.

5. A gear of the character described having integrally formed thereon a series of solid gear teeth and a continuous web, said web being integrally formed with said teeth and communicating with each of the gear teeth and extending substantially from the pitch circle to the root of the gear teeth.

6. A spur gear of the character described having integrally formed thereon solid gear teeth and a continuous web, said web extending at the side of the gear teeth from at least the root circle to a point below the pitch circle.

References Cited in the file of this patent

UNITED STATES PATENTS

| 415,044 | Joslin | Nov. 12, 1889 |
| 1,072,488 | Nichols | Sept. 9, 1914 |
| 2,076,926 | Timmermann | Apr. 13, 1937 |
| 2,199,906 | Bord | May 7, 1940 |

FOREIGN PATENTS

| 25,650 of 1904 | Great Britain | Oct. 19, 1905 |